United States Patent
Ernam et al.

[19]

[11] Patent Number: 6,097,951

[45] Date of Patent: *Aug. 1, 2000

[54] METHOD AND APPARATUS FOR WIRELESS NETWORK ARCHITECTURE BASED ON SUBSCRIBER DISTRIBUTION

[75] Inventors: Hakan Ernam; Jim Xu; Christopher S. Reece, all of Plano, Tex.

[73] Assignee: Northern Telecom Limited, Montreal, Canada

[*] Notice: This patent is subject to a terminal disclaimer.

[21] Appl. No.: 09/130,293

[22] Filed: Aug. 6, 1998

Related U.S. Application Data

[60] Provisional application No. 60/055,109, Aug. 6, 1997.

[51] Int. Cl.$^7$ ....................................................... H04Q 7/20
[52] U.S. Cl. ........................... 455/433; 455/560; 455/432; 455/445
[58] Field of Search ..................................... 455/445, 446, 455/560, 433, 426, 432, 436, 439, 435, 422, 507, 508

[56] References Cited

U.S. PATENT DOCUMENTS

| | | |
|---|---|---|
| 5,396,543 | 3/1995 | Beeson, Jr. et al. .................... 455/560 |
| 5,793,752 | 8/1998 | Clarke et al. ............................ 370/252 |
| 5,854,982 | 12/1998 | Chambers et al. ...................... 455/432 |
| 5,991,628 | 11/1999 | Pedziwiatr et al. ..................... 455/443 |

*Primary Examiner*—Nguyen Vo
*Assistant Examiner*—Marsha D. Banks-Harold
*Attorney, Agent, or Firm*—Haynes & Boone, L.L.P.

[57] ABSTRACT

A method and apparatus for scaling a wireless telecommunications network having an architecture based upon subscriber distribution includes providing a base station subsystem (BSS) and a pool of mobile switching centers (MSCs) interconnected with one another. The mobile switching centers include visitor location registers (VLRs). Lastly, a dispatcher mobile switching center (DMSC) is provided, the dispatcher mobile switching center being coupled between the base station subsystem (BSS) and the pool of mobile switching centers (MSCs) for establishing communication between the base station subsystem (BSS) and the pool of mobile switching centers (MSCs). The dispatcher mobile switching center (DMSC) further provides for distributing mobile station subscribers and call related work among the pool of mobile switching centers (MSCs).

25 Claims, 8 Drawing Sheets

METHOD AND APPARATUS FOR WIRELESS NETWORK ARCHITECTURE BASED ON SUBSCRIBER DISTRIBUTION

This application claims benefit of Provisional Application Ser. No. 60/055,109 filed Aug. 6, 1997.

BACKGROUND OF THE INVENTION

This application claims benefit of provisional application Ser. No. 60/055,109 filed Aug. 6, 1997.

1. Field of the Invention

The present invention relates generally to wireless telecommunications networks, and more particularly, to a scalable wireless network architecture.

2. Discussion of the Related Art

As a wireless telecommunications network grows, in order to support an increasing number of subscribers, the number of mobile switching centers (MSCs) must be increased. This results in decreased efficiency in the MSCs due to networking and mobility overhead and thus effectively limits the number of MSCs in the network. As more and more MSCs are placed in the wireless network, the gain in capacity starts to diminish. When this point is reached, subscriber demands cannot be adequately satisfied since there is too much overhead. The overhead disadvantageously reduces the amount of central processing unit (CPU) power which is available for call processing.

Currently, the introduction of a new mobile switching center (MSC) into a wireless network involves geographically partitioning a serving area of a market region into partitioned serving areas. The partitioned serving areas are each assigned to one mobile switching center (MSC). As the number of mobile switching centers (MSCs) increase within the market region, the serving areas gets smaller. In addition, there is an increased number of boundaries between MSCs. The increased number of boundaries means an increased mobility of subscribers between MSCs, which in turn leads to an increased consumption of real-time CPU processing power. That is, extra mobility starts to dominate a total work of the network. As a result, there is a disadvantageous reduction in network capacity.

FIG. 1 illustrates an exemplary market region 10 of a wireless telecommunications network. The market region 10 is divided into partitioned serving areas 12, each serving area assigned to an MSC as shown in the legend of FIG. 1. FIG. 2 illustrates another exemplary market region 20 of a wireless telecommunications network. The market region 20 is divided into partitioned serving areas 22(1-6), each serving area assigned to an MSC/VLR 24(1-6) as shown. The boundaries between adjacent MSCs are indicated by reference numeral 26(a-b), where (a-b) specifies the particular boundary as shown in FIG. 2.

Some wireless communications network operators divide the serving area of the highest running switch in two, thus creating two serving areas. The network operators then assigns a new switch to one of these areas, while the old switch remains associated with the other half. This potentially leads to very unoptimized networks since a random boundary is not likely to be a good one in terms of subscribers crossing the boundaries. Ad hoc partitioning methods take this one step further, trying to eliminate high mobility borders by observing the traffic in the network. Still the result is likely to be non-optimal in terms of balance and borders.

Other current methods which are used for network planning involve optimizing the boundaries between MSCs to reduce the mobility across the boundaries, while trying to balance CPU loads of the switches. This is done through theoretical modeling of the network and usage of heuristic optimization methods for a much better optimization. For a small number of switches, this gives acceptable results even though some capacity loss occurs. When a higher number of MSCs are necessary, however, mobility overhead inherently becomes very high and finding good boundaries becomes increasingly more difficult, often impossible and thus making it necessary to settle for a not so desirable solution. Reducing mobility is therefore desirable since mobility presents an extra, non-revenue generating type of work to be performed by the network, as opposed to call processing which is used to generate revenue.

Further in connection with the above and the high growth rate of wireless telecommunication networks, there is continuously the need to serve an ever increasing number of subscribers. As the capacity of the existing mobile switching centers (MSCs) are exhausted, there is a further need to introduce new MSCs into the network. A desirable goal would be to support the highest number of subscribers with the smallest possible number of MSCs. The most important problem, however, is to reduce the networking overhead that results from mobility of subscribers between the MSCs, wherein the networking overhead includes such things as location updates and handovers. In connection therewith, Inter-VLR (Visitor Location Registry) location updates and Inter-MSC handovers use CPU real time and therefore disadvantageously reduce an available computing power for handling call processing related tasks.

Current methods for establishing multi-MSC networks will now be discussed in further detail. A typical scenario is to start with a single MSC that can serve the initial subscribers in a particular service area of a market region. Eventually, given that the market is large enough and that the operator is successful, the number of subscribers will increase and the initial capacity will become exhausted. The exact exhaust point will depend upon the subscriber profile. At this point, a second MSC is then needed to serve the new and existing customers.

The market region is now divided into two geographical partitions and each MSC is given control over a respective partition. Each region then also becomes a unique VLR (visitor location register), often integrated with the serving MSC. Each MSC controls its own BSCs, BTSs and subscribers, location areas, etc. in its respective service area. In addition, each MSC is to serve each and every customer that is physically located in the respective area or partition at any given time.

Network system partitioning may be carried out in a number of ways. As stated above, when there are multiple MSCs, there is a need to define the boundaries of the serving areas for each switch or MSC. There are several ways of defining a partition, including trivial ones such as follows. In one instance, a network operator may divide the highest running switch's serving area in the middle into two parts, assign one partition to the new MSC, while the old one continues to serve the other half. In another instance, the network operator may divide the network or system so as to give each MSC switch equal coverage area. Equality may be viewed in terms of number of cells served, total traffic, area of coverage, etc. The major problem with these methods is that the boundary between the MSCs is a disadvantageous source of extra mobility work on the network as mobile users move across a boundary or boundaries. For example, if a boundary happens to be placed in a particularly high mobility area, what would have previously been an intra- BSC or an inter-BSC handover over the particular boundary will now become an inter-MSC handover. The inter-MSC handover is a much more costly operation from a network operation point of view. The same is valid for location updates. The extra load that the MSC has to handle due to these location updates and handovers can be excessive and actually diminish the total capacity of the overall network. Still further, the resulting CM loads of all the switches should be in close balance to eliminate potential bottlenecks in the network. The network capacity computed depends on the switch with the highest CPU load. When this particular switch (i.e., the switch with the highest CPU load) reaches it engineering limit, the capacity of the network is considered reached although other MSCs may have remaining capacity. This remaining capacity, no matter how large, is rendered unusable. If there is a large unbalance, the network has to be physically rearranged to make it balanced. Naturally, the highest CPU load should go down (i.e., be reduced) in the process for obtaining a capacity gain.

Minimizing the mobility load while balancing the loads of the MSCs can be modeled as an abstract graph partitioning problem. Heuristics can be used to partition the network. Using heuristics, given that a number of MSCs are needed, coverage areas can be determined in such a way as to maximize subscriber capacity. Once a graph representing call processing and mobility within the network is obtained, projection can be used for determining as to how many switches are needed to support a given number of subscribers. The resulting graph, however, is sensitive to errors in the data collection process. In addition, implementation of a resulting study takes a long time to complete because it involves repartitioning BSCs, rehoming of BTS and BSCs, reassignment of LAC codes. Due to long time and high effort, network operators generally do not exactly implement the proposals, which may result in unbalanced loads and reduced capacity.

As higher numbers of MSCs are employed, networking overhead increases. Two MSCs working together will not have a total networked capacity of twice a single MSC due to mobility overhead. In other words, every additional MSC will give diminishing returns. As previously mentioned, examples of such mobility overhead include inter-VLR location updates per subscriber and inter-MSC handovers per call. Therefore, there is a practical limit to the number of MSCs that can be placed into a network with meaningful gains, after which the extra overhead work will eliminate any potential gains provided by the new switch.

Various abbreviations and acronyms are used herein and shall be understood to have conventional meanings as are known in the telecommunications art, except as may be noted otherwise herein.

It would thus be desirable to provide a scalable wireless network architecture which overcomes the problems discussed herein above.

SUMMARY OF THE INVENTION

The wireless network architecture of the present disclosure includes a networking architecture for multiple mobile switching center wireless networks employing a dispatcher switch to distribute subscribers and call related work among the mobile switching centers of a given network.

According to one embodiment of the present disclosure, a method for scaling a wireless telecommunications network having an architecture based upon subscriber distribution includes providing a base station subsystem (BSS) and a pool of mobile switching centers (MSCs) interconnected with one another. The mobile switching centers include visitor location registers (VLRs). Lastly, a dispatcher mobile switching center (DMSC) is provided, the dispatcher mobile switching center (DMSC) being coupled between the base station subsystem (BSS) and the pool of mobile switching centers (MSCs) for establishing communication between the base station subsystem (BSS) and the pool of mobile switching centers (MSCs). The dispatcher mobile switching center (DMSC) further is provided for distributing mobile station subscribers and call related work among the pool of mobile switching centers (MSCs).

According to another embodiment, providing the dispatcher mobile switching center (DMSC) includes providing a table of subscribers and corresponding MSC/VLR entries. Each subscriber corresponds to a mobile station identification (mob_id) and each corresponding MSC/VLR entry corresponds to a particular mobile switching center/visitor location register identification (VLR_id) of the pool of mobile switching centers (MSCs). A corresponding MSC/VLR entry is assigned to the subscriber when the mobile station of the respective subscriber is initially powered up. The table further may include MSC/VLR identifications (VLR_ids) indexed by identity of mobile subscribers (mob_ids). The table still further may include a pseudo visitor location register (pseudo VLR) having a structure optimized for very fast searches and updates.

According to another embodiment, a wireless telecommunications network having an architecture based upon subscriber distribution includes a base station subsystem (BSS) and a pool of mobile switching centers (MSCs) interconnected with one another. The mobile switching centers include visitor location registers (VLRs). Lastly, the network includes a dispatcher mobile switching center (DMSC) coupled between the base station subsystem (BSS) and the pool of mobile switching centers (MSCs) for establishing communication between the base station subsystem (BSS) and the pool of mobile switching centers (MSCs). The dispatcher mobile switching center (DMSC) further is for distributing mobile station subscribers and call related work among the pool of mobile switching centers (MSCs).

In another embodiment, the dispatcher mobile switching center (DMSC) includes a table of subscribers and corresponding MSC/VLR entries, each subscriber corresponding to a mobile station identification (mob_id) and each corresponding MSC/VLR entry corresponding to a particular mobile switching center/visitor location register identification (VLR_id) of the pool of mobile switching centers (MSCs). A corresponding MSC/VLR entry is assigned to the subscriber when the mobile station of the respective subscriber is initially powered up. In addition, the dispatcher mobile switching center (DMSC) further assigns a subscriber mobile station identification (mob_id) to a corresponding mobile switching center/visitor location identification (VLR_id) according to a prescribed assignment.

In yet another embodiment, the dispatcher mobile switching center (DMSC) makes use of the table entry associations of subscribers and corresponding MSC/VLR entries in order to decide which mobile switching center (MSC) of the pool of mobile switching centers (MSCs) to route a mobile originated call when one occurs.

Still further, in another embodiment, providing the dispatcher mobile switching center (DMSC) further includes performing a land to land call upon the occurrence of a mobile terminated call/paging procedure, a home location register (HLR) being provided for tracking of visitor location registers (VLRs) and subscribers according to GSM standards, the mobile terminated call being first routed to a gateway mobile switching center (GMSC) and then being routed to the base station subsystem (BSS) through the dispatcher mobile switching center (DMSC).

Yet still further, in another embodiment, providing the dispatcher mobile switching center (DMSC) includes only traffic routing and subscriber assignments, the dispatcher mobile switching center (DMSC) for distributing call processing loads onto the mobile switching centers (MSCs) of the pool of mobile switching centers (MSCs).

In another embodiment, providing the dispatcher mobile switching center (DMSC) includes traffic routing and subscriber assignments, the dispatcher mobile switching center (DMSC) for distributing call processing loads onto the mobile switching centers (MSCs) of the pool of mobile switching centers (MSCs), the dispatcher mobile switching center (DMSC) further having a capability of having resident subscribers and for performing call processing of its own.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which.

DETAILED DESCRIPTION OF THE PREFERRED EMBODIMENTS

The network architecture according to the present embodiments advantageously eliminates most of the mobility work done by the MSCs, such as Inter-VLR Location Updates (VLR: Visitor Location Registry) and Inter-MSC handovers. As mentioned herein, it is the mobility work which costs the most in terms of real CPU power. The present scalable wireless network architecture thus advantageously reduces a mobility work taxation of the CPU, as will be further discussed herein below.

Figure 1:
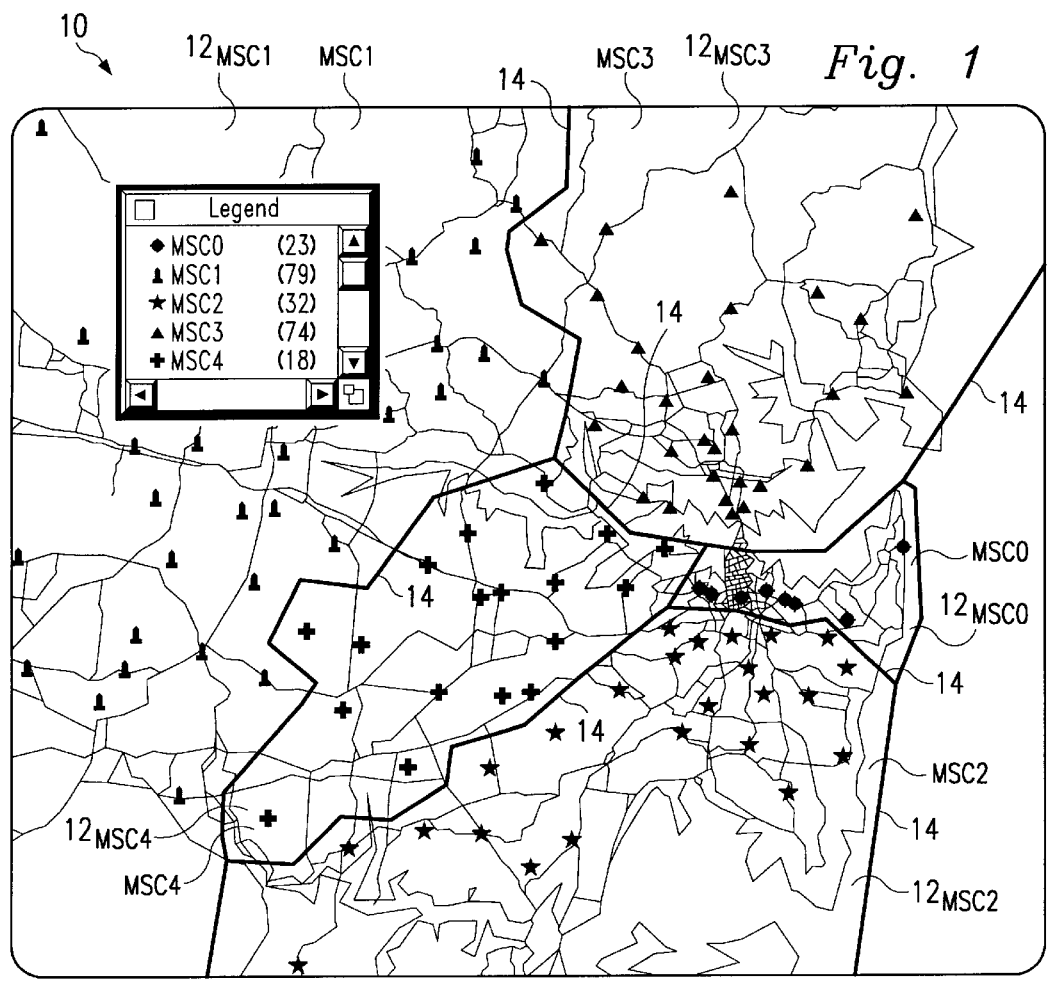
FIG. 1 illustrates an exemplary market region of a wireless telecommunications network, including serving areas and MSCs.
Figure 2:
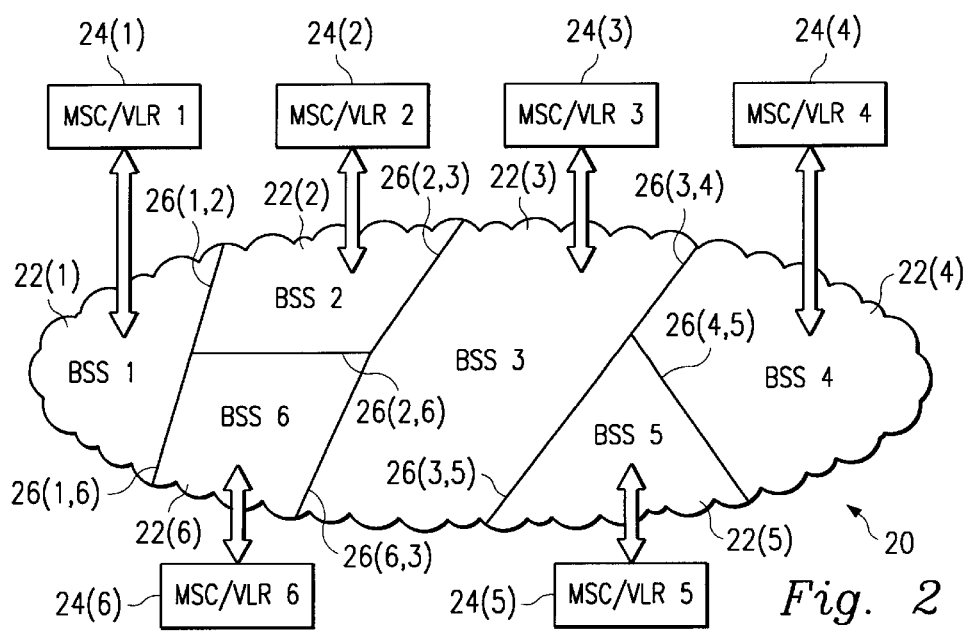
FIG. 2 illustrates another exemplary market region of a wireless telecommunications network, including serving areas and MSCs.
Figure 3:
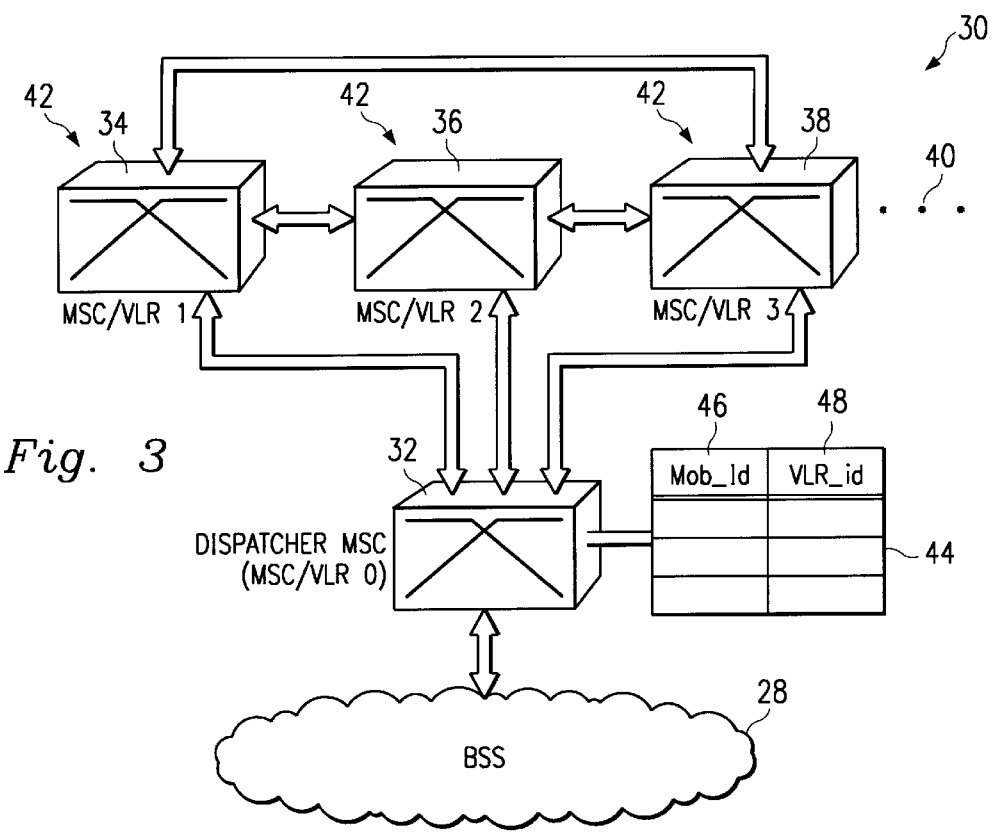
FIG. 3 illustrates a schematic overview of the scalable wireless network architecture of the present disclosure.

Referring now to FIG. 3, according to the scalable wireless network architecture of the present disclosure, a base station subsystem (BSS) 28 side of the wireless network 30 is connected to a special kind of switch 32. The switch 32 preferably includes an MSC as modified and discussed further herein below. The special switch 32 is also referred to herein as the "dispatcher" MSC, DMSC, or router MSC. The dispatcher switch 32 distributes mobile subscribers among other MSCs 34, 36, 38, and 40 (etc.), of the wireless network 30. The other MSCs constitute a pool of interconnected switches and communicate with the base station subsystem (BSS) 28 through the special dispatcher switch 32 or dispatcher MSC (DMSC). The dispatcher switch 32 maintains a table 44 of subscribers (Mob_id) 46 and their corresponding MSC/VLR entries (VLR_id) 48 which were set when the mobile unit of a respective subscriber was first powered up. The setting (or assignment) of the subscribers (Mob_id) 46 to the VLRs (VLR_id) 48 is also done by the dispatcher switch 32, according to a prescribed assignment. That is, the dispatcher switch 32 assigns a subscriber to one of the MSC/VLRs (34, 36, 38, and 40 (etc.)) and keeps a record of the association in table 44, in order to decide which MSC to route a mobile originated call when one occurs.

Since every element of BSS 28 is now connected to some MSC (34, 36, 38, and 40 (etc.)) and every other MSC in the network sees the same area, there is no longer a need for an Inter-MSC handover or Inter-VLR location update. A subscriber will be always on one of the VLRs which cover the whole service area. Wherever a subscriber moves within the serving area, it will always be homed to the same MSC/VLR. Therefore each MSC will behave similar to a standalone mobile station subsystem (MSS), which have high capacity since there is not much interaction with the other switches.

Figure 4:
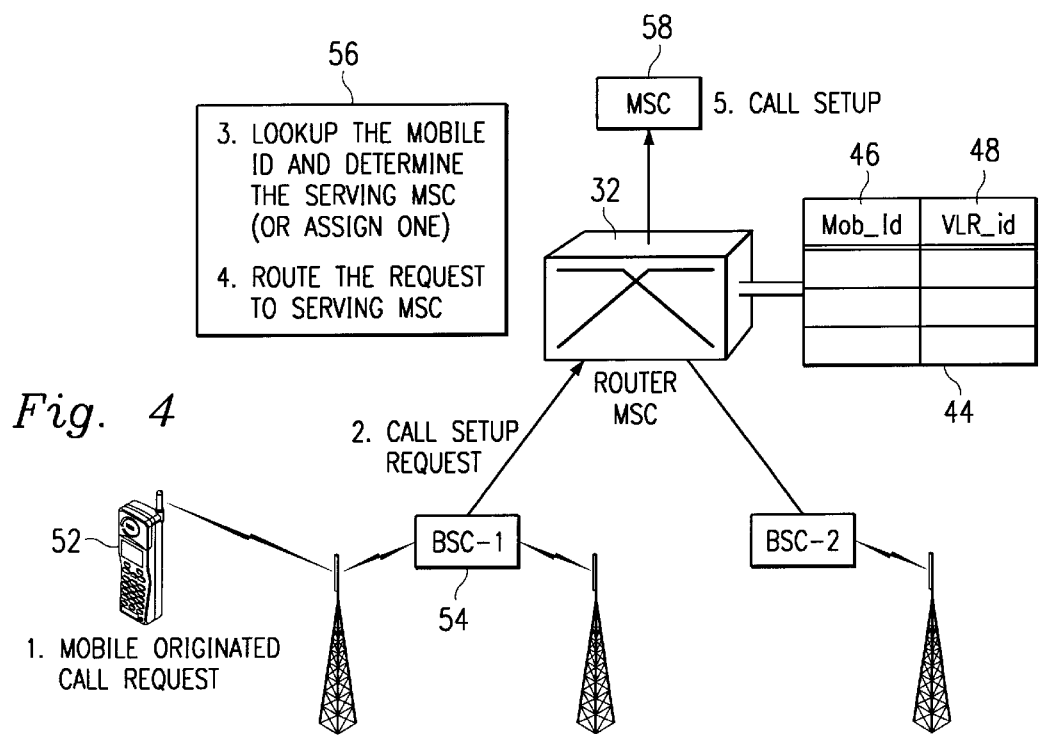
FIG. 4 illustrates a mobile originated call establishment using the scalable wireless network architecture of the present disclosure.

With reference now to FIG. 4, mobile originated calls are routed to a home MSC 58 or gateway MSC (GMSC) by the dispatcher MSC 32, which in turn establishes and controls a given call session to the end thereof. Mobile originated calls will be discussed in further detail herein below.

Figure 5:
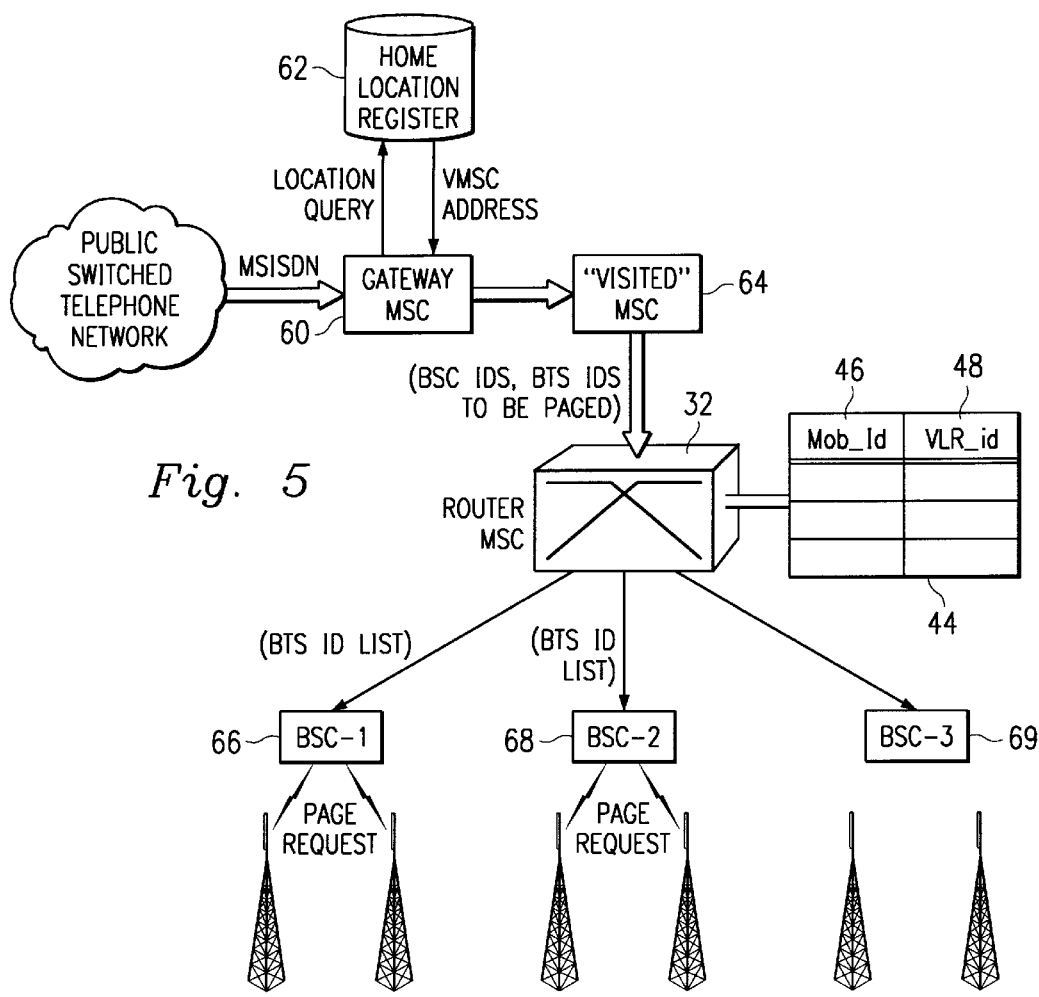
FIG. 5 illustrates a mobile terminated call/paging procedure using the wireless network architecture of the present disclosure.

Referring now briefly to FIG. 5, for a mobile terminated call/paging procedure, a home location register (HLR) 62 is included. The home location register (HLR) 62 will keep track of VLRs and subscribers as in the GSM system standards. For a mobile terminated call/paging procedure, a mobile terminated call is first routed to the home or gateway MSC (GMSC) 60 and then routed to the appropriate base station subsystem (BSS) 66, 68, or 69 through the dispatcher MSC 32. In this case, the dispatcher MSC 32 will perform a land to land call, which is inexpensive in terms of CPU real time. Mobile terminated calls/paging procedure will be discussed in further detail herein below.

Figure 6:
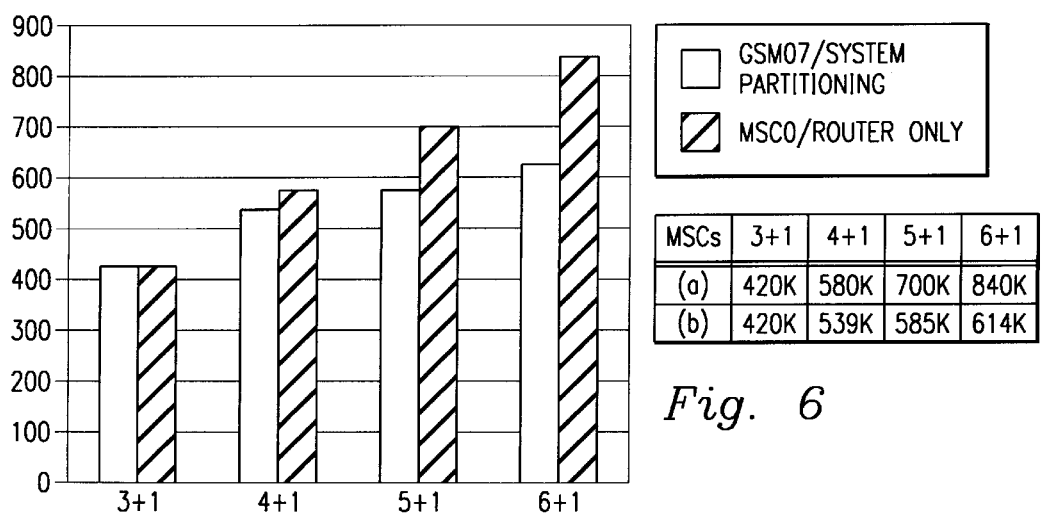
FIG. 6 illustrates a theoretical comparison of wireless network capacity between geographical GSM07/System Partitioning and MSC0/Router partitioning according to the wireless network architecture of the present disclosure.

The present embodiments advantageously provide increased network capacity for a given number of MSCs. Benefits increase as higher numbers of MSCs are put into the network. With around five (5) MSCs, it seems reasonable at this point that capacity gains exceeding twenty percent (20%) can be expected. An example of estimated capacity figures are illustrated in FIG. 6. In the table of FIG. 6, row (a) refers to capacity provided by the dispatcher MSC (router MSC) of the embodiments of the present disclosure.

Dispatcher MSC (router MSC) preferably provides only traffic routing and subscriber assignment. The row (b) entries of the table refer to theoretical maximum capacity figures obtained with known geological partitioning. From the table and graph of FIG. 6, for 5+1 MSCs and above, an approximate twenty percent (20%) gain in capacity is achieved with the use of the dispatcher MSC for traffic routing and subscriber assignment only.

The present embodiments further eliminates any BSC and BTS rehoming procedure which is necessary to introduce an MSC with the current known methods, thus saving considerable work and effort on the part of the wireless network operators. The present embodiments further reduce a time required to introduce a new MSC switch in the wireless telecommunications network, since there are no base station subsystem (BSS) modifications to the wireless network system. Previously mentioned optimization studies and their corresponding physical implementations take quite a long time and are thus advantageously avoided with the scalable wireless network architecture of the embodiments of the present disclosure. The present embodiments further enable wireless network system planners to better predict a networked capacity of a particular wireless network since it will not be necessary to predict the mobility load.

The method and apparatus for a scalable wireless network architecture based on subscriber distribution according to the present disclosure is based upon distributing the work due to call processing onto several MSCs, and not based on geography, but relative loads and subscriber distribution. The work distributing device includes a special switch or MSC which is configured to perform the task of distributing the work due to call processing. The goal is to eliminate inter-MSC handovers and inter-VLR location updates, except those coming from outside a prescribed service area. These external transactions (i.e., calls coming from outside a prescribed service area) are negligible in number compared to internal events, although the ability to interwork any device that conforms to published standards is important. Referring once again to FIG. 3, a schematic overview of the architecture of the present embodiment of the scalable network is shown. MSC/VLR0 or the dispatcher MSC 32 is mainly responsible for distributing the load onto other MSCs (34, 36, 38, and 40 (etc.)) in the pool, although the dispatcher MSC 32 may also include a capability of having resident subscribers and performing call processing of its own. The dispatcher MSC or switch 32 can be thought of as a gateway MSC between the NSS and BSS, analogous to a gateway MSC between PSTN and the NSS.

The dispatch MSC (router MSC) 32 in FIG. 3 includes a special purpose table 44. Special purpose table 44 keeps or maintains subscribers' VLRs (VLR_ids) 48 indexed by the identity of the mobile subscriber (mob_id) 46. Table 44 is further defined as a "pseudo VLR". The table structure is preferably optimized for very fast searches and updates.

IMSI attach, IMSI detach, and location updates shall now be discussed with respect to FIGS. 3–5, and 7–11. First let us consider IMSI attaches and Inter-VLR location updates. Location updates are handled by a prescribed home MSC. Each MSC/VLR will have a copy of the subscriber data that were assigned to it. Since each VLR covers the entire service area, inter-VLR location updates will be greatly reduced. When a mobile station does its first attach, the dispatcher or router MSC 32 checks the table 44 to see if the user (mob_id) 46 is already registered in one of the connected MSC/VLRs. According to the outcome of the inquiry, two types of action may be taken. When the mobile station is registered in a VLR, then the attach message is routed via DMSC 32 to the corresponding MSC/VLR (34, 36, 38, or 40 (etc.)) and the attach operation is completed. When the mobile station has not been registered in any of the VLRs (or if it has been deleted in an audit), then the dispatcher or router MSC 32 assigns the mobile station to one of the MSC/VLRs (34, 36, 38, and 40 (etc.)) depending on some predetermined or dynamic criteria, and keeps a record of the association in the "pseudo VLR" table 44 of dispatcher MSC 32. In this case, the assigned MSC/VLR will perform a location update and inform the HLR of the update, thus conforming to the published standards.

Figure 7:
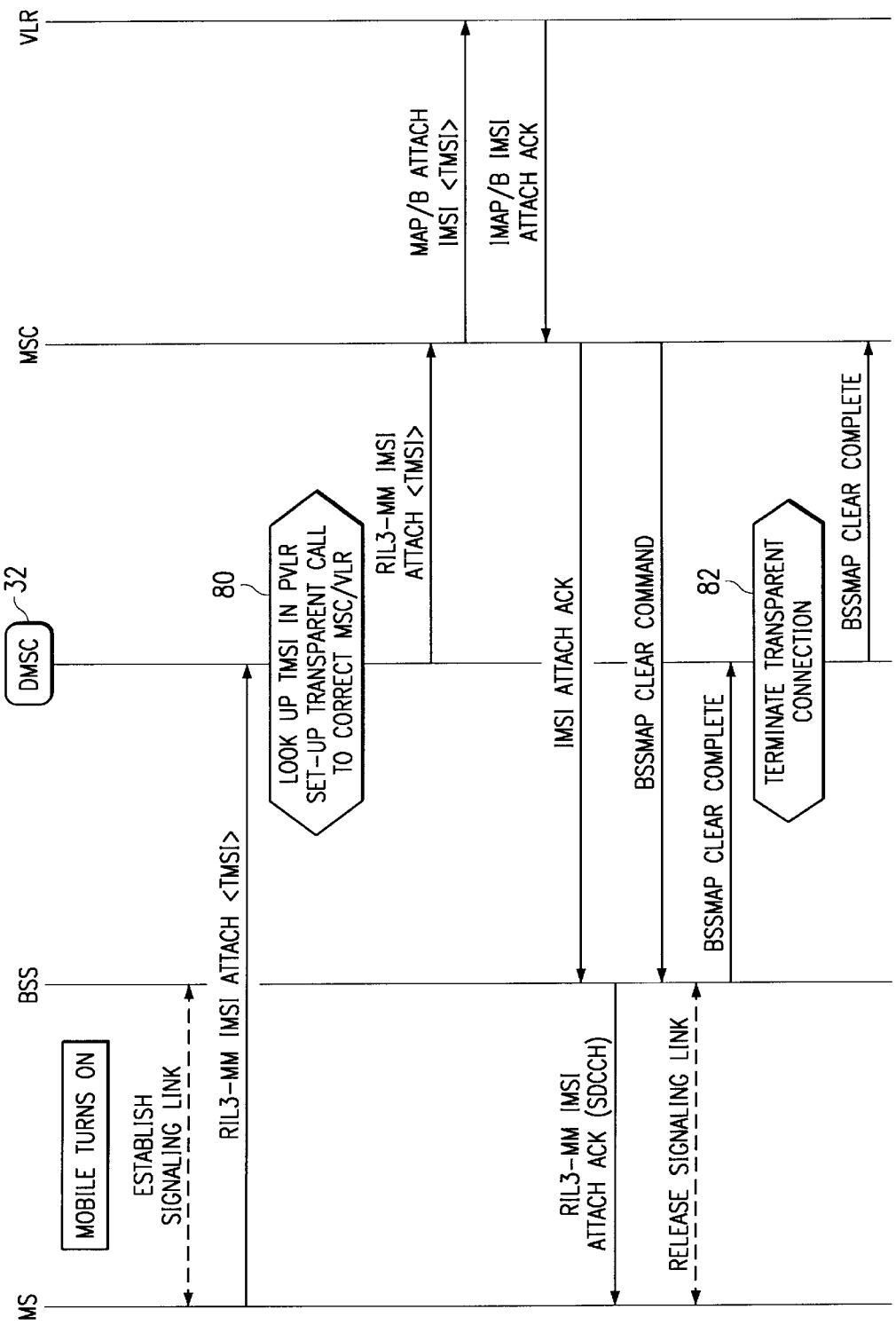
FIG. 7 illustrates an IMSI attach procedure using the wireless network architecture of the present disclosure.
Figure 8:
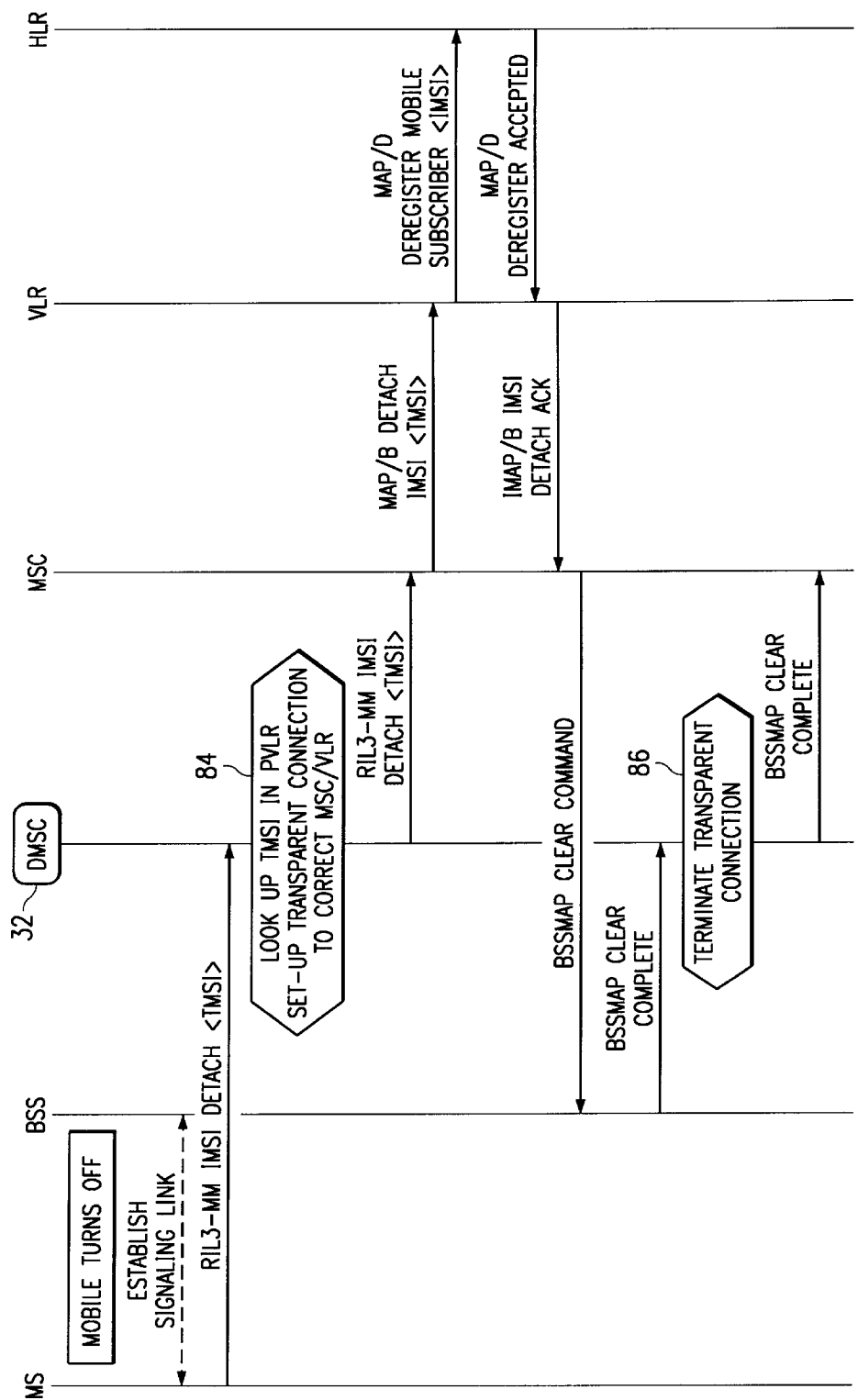
FIG. 8 illustrates an IMSI detach procedure using the wireless network architecture of the present disclosure.

FIG. 7 shows IMSI attach procedure message flows using the dispatcher MSC 32 according to the present disclosure. As indicated by reference numeral 80 of FIG. 7, the dispatcher MSC 32 provides a look-up of the TMSI in the pseudo VLR (PVLR) 44. The dispatcher MSC 32 also provides set-up for a transparent call to a correct MSC/VLR (34, 36, 38, 40 (etc.)) as appropriate. Subsequent to an IMSI attach acknowledgment and BSSMAP clear completion, the dispatcher MSC 32 terminates the transparent connection, as indicated by reference numeral 82 of FIG. 7. FIG. 8 outlines an IMSI detach procedure using the dispatcher MSC 32 according to the present disclosure. As indicated by reference numeral 84 of FIG. 8, the dispatcher MSC 32 provides a look-up of the TMSI in the pseudo VLR (PVLR) 44. The dispatcher MSC 32 then provides set-up for a transparent connection to a correct MSC/VLR (34, 36, 38, 40 (etc.)) as appropriate. Subsequent to an IMSI detach acknowledgment and BSSMAP clear completion, the dispatcher MSC 32 terminates the transparent connection, as indicated by reference numeral 86 of FIG. 8.

Let us now further discuss inter-VLR location updates. Inter-VLR location updates will be unnecessary except to balance load and interwork with other switches that are not served by the dispatcher mobile switching center (DMSC) 32, or that do not support that feature. In such an instance, an inter-VLR location update can be accomplished as follows. A serving area of a wireless network can be thought of as being represented for example by an ellipse. Consider mobile switching centers MSC-2 to MSC-n to represent a first MSC/VLR pool that a first dispatcher MSC (DMSC) serves. In addition, consider another mobile switching center (MSC-1) to represent an MSC/VLR which does not belong to the first pool and has its own geographical serving area. MSC-1 can be replaced by another MSC/VLR pool which is served by another DMSC, different from the first DMSC. The methodology that is described herein with respect to the use of the DMSC for a given MSC/VLR pool would not change. A boundary for an inter-VLR Location update is necessary between MSC-1 of the second MSC/VLR pool and the first MSC/VLR pool.

In a dispatcher MSC (or DMSC) serving area, corresponding, for example, to a whole service area in a metropolitan city, a Location Area Identifier that is to be broadcast over the air interface will include a single VLR id (VLR_id). This id can be equal to one of the MSC's id or could be a completely different one. The DMSC will handle the mapping of subscribers to real MSC/VLRs within the MSC/VLR pool. This way, to a mobile station that conforms to the standards, the whole area will look like a single very large MSC.

A situation wherein a mobile station leaves a first coverage area of a Base Station Transceiver (BTS) and enters into a serving area of another second BTS shall now be briefly discussed. Since the two BTSs are under the control of different MSCs, an inter-VLR location update is initiated by the mobile station upon entering of the second serving area by the mobile station. A location update request is made through the BTS and BSC of the second serving area. Upon receiving the message, DMSC selects one of the MSCs that it serves and transfers the request to the selected MSC/VLR. The target MSC id is recorded in the pseudo VLR of the DMSC, for later referral. The target MSC will perform the rest of the inter-VLR location update procedure with the HLR and MSC as in the published standards.

Figure 9:
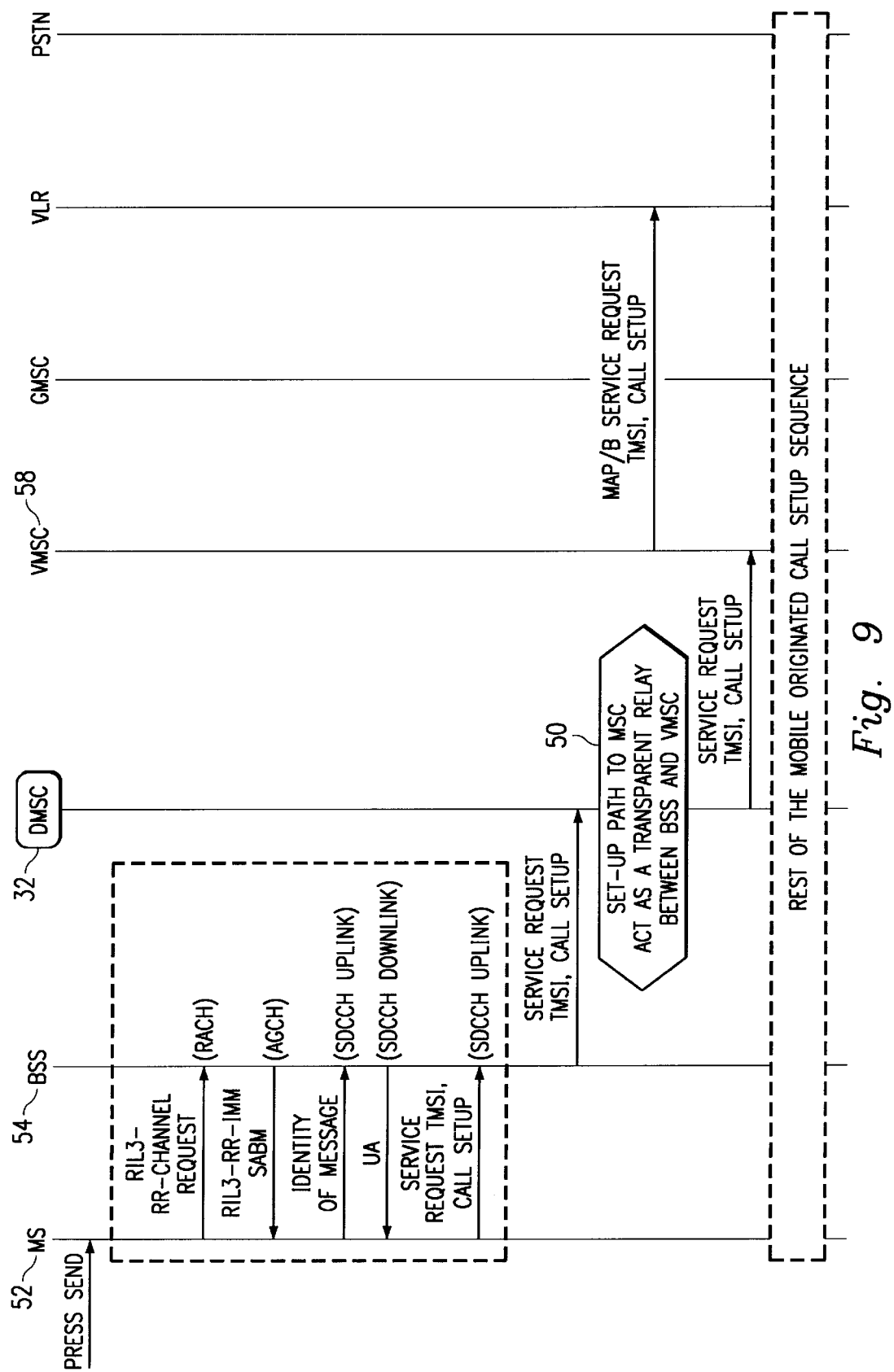
FIG. 9 illustrates a mobile originated call flow diagram of a mobile originated call setup sequence using the wireless network architecture of the present disclosure.

Call processing for mobile originated calls shall now be briefly discussed with reference to FIGS. 4 and 9. FIG. 4 describes a way of realizing a mobile originated call. FIG. 9 shows an example message flow diagram for a mobile originated call.

With reference again to FIG. 4, for a Mobile Originated call, BSC-1 (54) receives a mobile originated call request from the mobile 52 and initiates the call setup with the DMSC 32. DMSC 32 receives the attempt and checks the special table (pseudo VLR) 44 to see where to send the CMSR (CM Service Request) with proper MTP/SCCP addresses changed and routes the request to the subscriber's home MSC/VLR (see box labeled 56 in FIG. 4). In this example, let's assumes MSC 58 is the home MSC/VLR. The home MSC 58 sets up the RR/MM connection after it receives the CMSR message. Call setup then proceeds as defined in the GSM standards. The MSC 58 will be the anchor MSC throughout the particular call. The dispatcher or router MSC 32 transfers all A-interface messages transparently to the anchor MSC 58. Anchor MSC 58 will handle the inter MSC handovers that occur between regions. Each MSC/VLR will be under the impression that it controls the whole service area, BSCs, BTSs and location areas. Box 56 in FIG. 4 briefly describes the job of the DMSC 32. If DMSC 32 fails to find the mobile id (mob_id) 46 in the pseudo VLR (PVLR) 44, it means that the particular mobile was not registered in this particular serving area before. As a result, DMSC 32 will go ahead and select an MSC to serve the particular subscriber. As shown in FIG. 9, DMSC 32 acts to set up the path to the MSC, further to act as a transparent relay between BSS and the VMSC, as indicated by reference numeral 60.

Figure 10:
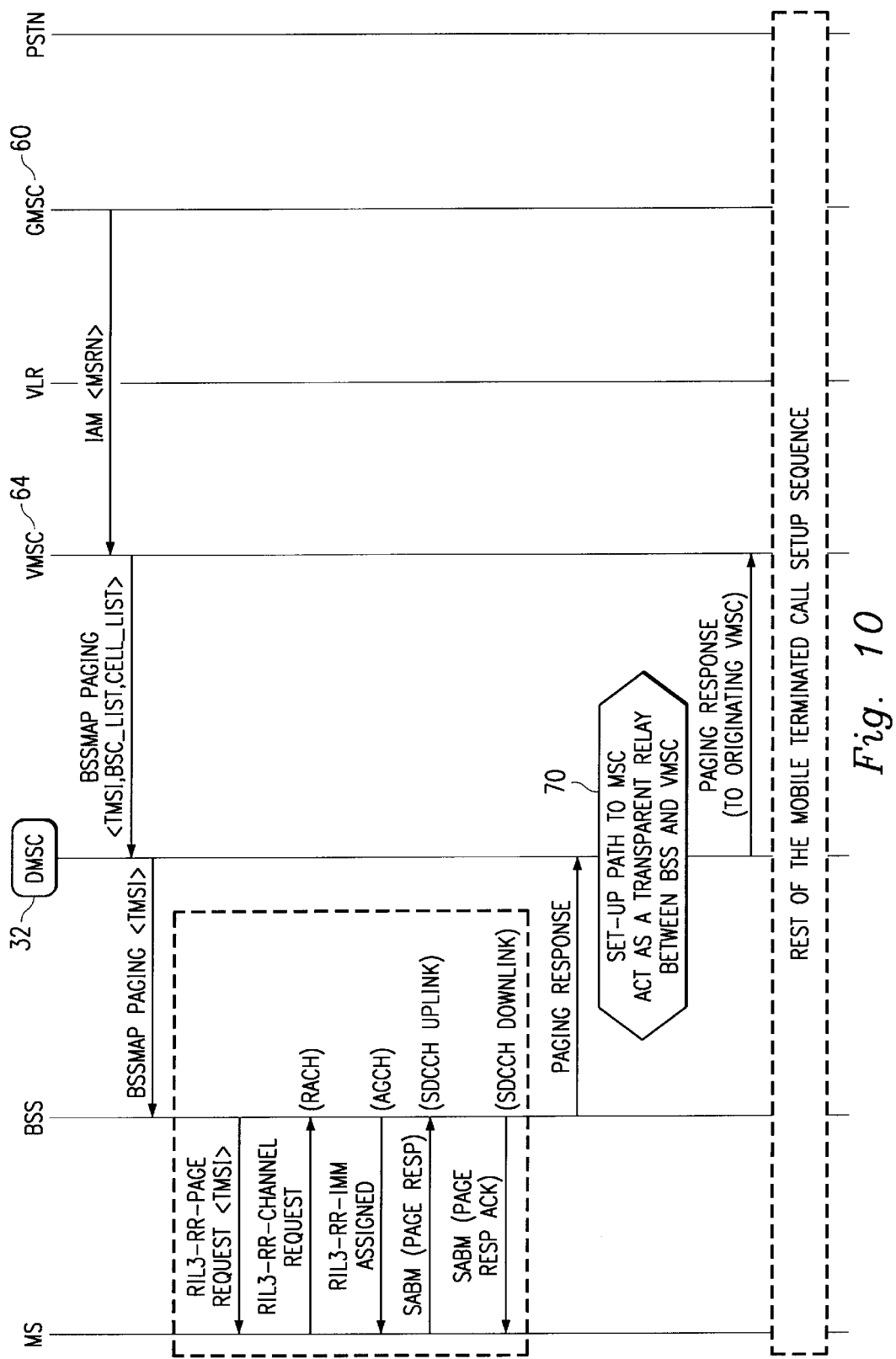
FIG. 10 illustrates a mobile terminated call flow diagram of a mobile terminated call setup sequence using the wireless network architecture of the present disclosure.

Mobile terminated calls shall now be discussed with reference to FIGS. 5 and 10. With respect to this discussion of mobile terminated calls, let's assume that the call is a land to mobile call. In other words, a land line subscriber places a call to a mobile telephone user.

Turning to FIG. 5, for a mobile terminated call, the call will be routed to the gateway MSC (GMSC) 60, as in the GSM standards based on the mobile unit's directory number (DN). The routing can sometimes be done on a "round robin" basis. In any case, the GMSC 60 will query the HLR (Home Location Register) 62. The HLR 62 knows the VLR of the mobile and informs the gateway 60 as in the GSM standards. The call is then routed by the GMSC 60 to the visited MSC 64. The MSC 64 knows the LAC (Location Area Code) that the mobile is in, since Inter-VLR location updates are performed, as described herein. VMSC 64 initiates the paging procedure and establishes the call through the dispatcher or router MSC 32. Since there is no direct channel between an MSC and BSCs, the paging message that VMSC 64 sends to DMSC 32 is slightly different than a paging request sent to the BSS in the scenario that a BSC is directly controlled by a single MSC. The difference is that the VMSC 64 needs to inform DMSC 32 as to which BSCs need to be informed of the paging request based on the subscriber's last known location area. In other words, VMSC 64 sends the paging message to the DMSC 32, together with the LAC id. The dispatcher or router MSC 32 will treat the call as a land to land (transit) call. DMSC 32 then sends a regular paging message to the BSCs (in this example, only BSC-1 (66) and BSC-2 (68)) that were included in the list, with the cell list to be paged. Paging then progresses in the usual manner. When (i.e., if) the subscriber answers the paging message, the DMSC 32 establishes a connection between the respective BSC that received the page response and the calling MSC 64. The remainder of the call setup is then done as stated in the GSM standards. After the conversation ends, upon the release message, the DMSC 32 breaks the connection between MSC 64 and the respective BSC, after relaying the proper release messages between the two entities. As shown in FIG. 10, an informal call flow diagram example for the above outlined process is illustrated. DMSC 32 does the set-up of the path to the VMSC 64 and acts as a transparent relay between the BSS and the VMSC, as indicated by reference numeral 70.

Handover processing will now be discussed. Intra-BSC handovers are handled by the serving BSC and the serving MSC as in the current networks. The transparent dispatcher or router MSC 32 will continue to route messages between the BSC and the MSC.

Figure 11:
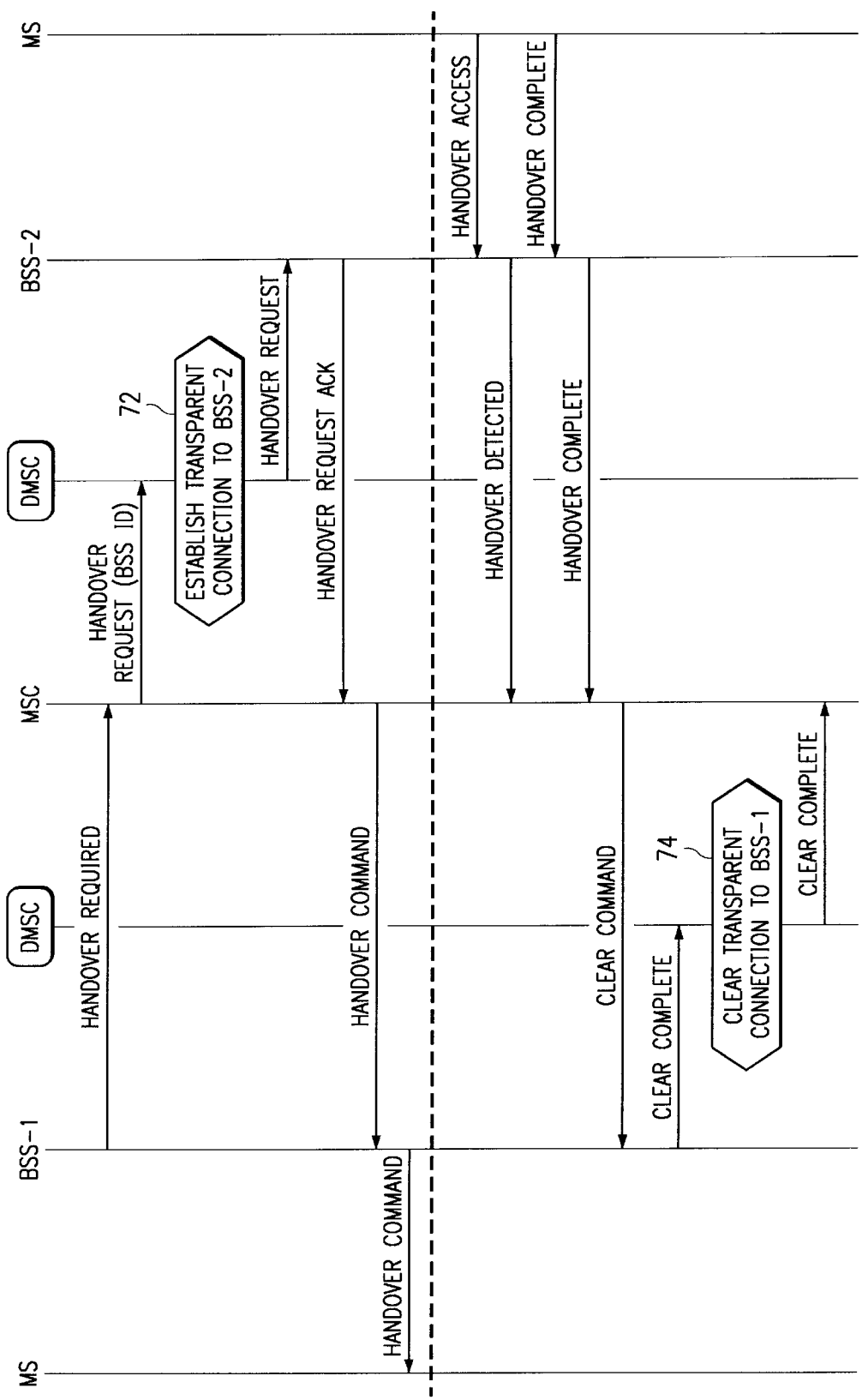
FIG. 11 illustrates an Inter-BSC handover call flow diagram of a mobile station using the wireless network architecture of the present disclosure.

FIG. 11 provides an example message flow diagram of an inter-BSC handover. When a BSC serving a mobile decides there is a need for an inter-BSC handover, serving BSC will inform the serving MSC (relay MSC) and this MSC will handle the inter-BSC handover as in the standards. That is, the serving MSC will select a target cell based on several criteria and inform the target BSC of the incoming handover. The communication between the serving MSC and the BSCs will be handled by the dispatcher or router MSC 32. The dispatcher or router MSC 32 will be able to break the transmission path from the serving MSC to the source BSC and establish a new connection towards the target MSC. Establishing of a transparent connection to BSS-2 by the DMSC is indicated by reference numeral 72 of FIG. 11. In addition, clearing of a transparent connection to BSS-1 by the DMSC is indicated by reference numeral 74 of FIG. 11.

With respect to inter-MSC handovers, there will not be a need for inter-MSC handovers within the system. When there is an incoming mobile unit from another network, only then will there be a need to do an inter-MSC handover. In this case, the dispatcher or router MSC 32 will decide which MSC in the MSC pool will serve the particular mobile, and after this assignment, the handover will take place as in the standards.

The scalable wireless network architecture as described herein advantageously maximizes a multi-MSC network subscriber capacity by reducing the mobility overhead within the network. According to the present disclosure, subscribers are partitioned onto MSCs instead of using geographical partitioning. A router or dispatcher MSC is used for connecting a BSS to other MSCs over the A-interface. The dispatcher MSC distributes traffic load dynamically among the other MSCs of the wireless network. As a result, BSS behaves as if it is connected to one giant MSC, thus drastically reducing mobility overhead.

The network architecture of the present disclosure provides advantages and benefits as follows. Increased network capacity is achieved through decreased number of boundaries and geographical partitions which generate mobility overhead. The present scalable wireless network requires considerably less network RF modifications as new MSCs are introduced into the wireless network. An improved utilization of MSC capacities is accomplished through load balancing using the dispatcher MSC. Bottleneck MSCs can be easily relieved, thus resulting in higher network capacity. The present scalable wireless network architecture, and in particular, the dispatcher MSC can be implemented in software according to the functions as discussed herein, further using programming techniques known in the art. Still further, the present scalable wireless network will interwork with various vendors equipment according to GSM standards. The dispatcher MSC or router MSC may also have resident subscribers and can handle traffic, as may be necessary for a particular wireless network requirement. Lastly, HLR capacity is advantageously increased without any modifications due to less (i.e. a decreased number of) location updates as a result of implementation of the dispatchers MSC of the scalable wireless network.

While the invention has been particularly shown and described with reference to the preferred embodiment thereof, it will be understood by those skilled in the art that various changes in form and detail may be made therein without departing form the spirit and scope of the invention, as set forth in the following claims.

What is claimed is:

1. A method for scaling a wireless telecommunications network having an architecture based upon subscriber distribution, said method comprising the steps of:

providing a base station subsystem (BSS);

providing a pool of mobile switching centers (MSCs) interconnected with one another, the mobile switching centers including visitor location registers (VLRs); and providing a dispatcher mobile switching center (DMSC) coupled between the base station subsystem (BSS) and the pool of mobile switching centers (MSCs) for establishing communication between the base station subsystem (BSS) and the pool of mobile switching centers (MSCs), the dispatcher mobile switching center (DMSC) further for distributing mobile station subscribers and call related work among the pool of mobile switching centers (MSCs).

2. The method of claim 1, wherein said step of providing the dispatcher mobile switching center (DMSC) further includes providing a table of subscribers and corresponding MSC/VLR entries, each subscriber corresponding to a mobile station identification (mob_id) and each corresponding MSC/VLR entry corresponding to a particular mobile switching center/visitor location register identification (VLR_id) of the pool of mobile switching centers (MSCs), a corresponding MSC/VLR entry being assigned to the subscriber when the mobile station of the respective subscriber is initially powered up.

3. The method of claim 2, wherein said step of providing the dispatcher mobile switching center (DMSC) further includes assigning a subscriber mobile station identification (mob_id) to a corresponding mobile switching center/visitor location identification (VLR_id) according to a prescribed assignment.

4. The method of claim 2, wherein said step of providing the dispatcher mobile switching center (DMSC) further includes making use of the table entry associations of subscribers and corresponding MSC/VLR entries in order to decide which mobile switching center (MSC) of the pool of mobile switching centers (MSCs) to route a mobile originated call when one occurs.

5. The method of claim 2, wherein said step of providing the dispatcher mobile switching center (DMSC) further includes performing a land to land call upon the occurrence of a mobile terminated call/paging procedure, a home location register (HLR) being provided for tracking of visitor location registers (VLRs) and subscribers according to GSM standards, the mobile terminated call being first routed to a gateway mobile switching center (GMSC) and then being routed to the base station subsystem (BSS) through the dispatcher mobile switching center (DMSC).

6. The method of claim 2, wherein the table includes MSC/VLR identifications (VLR_ids) indexed by identity of mobile subscribers (mob_ids).

7. The method of claim 6, wherein the table further includes a pseudo visitor location register (pseudo VLR) having a structure optimized for very fast searches and updates.

8. The method of claim 2, wherein upon an initial attach of a mobile station, the dispatcher mobile switching center (DMSC) checks the table entry associations to determine if the mobile station is registered in one of the MSC/VLRs of the pool of MSCs and (a) if the mobile station is registered, then an attach message is routed to the corresponding MSC/VLR and an attach operation is completed, and (b) if the mobile station is not registered, then the dispatcher mobile switching center (DMSC) assigns the mobile station to one of the MSC/VLRs of the pool of MSCs depending upon a prescribed criteria and keeps a record of the association in the table of the dispatcher mobile switching center (DMSC).

9. The method of claim 2, wherein upon a mobile station originated call, the BSS initiates a call setup with the dispatcher mobile switching center (DMSC), the dispatcher mobile switching center (DMSC) then checks the table entry associations to determine if the mobile station is registered in one of the MSC/VLRs of the pool of MSCs and (a) if the mobile station is registered, then the DMSC acts as a transparent relay between the BSS and the corresponding MSC of the pool of MSCs, the DMSC transferring all A-interface messages transparently to the corresponding MSC, wherein the call setup proceeds thereafter according to GSM standards, and (b) if the mobile station is not registered, then the dispatcher mobile switching center (DMSC) assigns the mobile station to one of the MSC/VLRs of the pool of MSCs depending upon a prescribed criteria, keeps a record of the association in the table of the dispatcher mobile switching center (DMSC), and then proceeds as if the mobile station is registered.

10. The method of claim 1, wherein said step of providing the pool of mobile switching centers (MSCs) includes providing at least five (5) mobile switching centers.

11. The method of claim 1, wherein said step of providing the dispatcher mobile switching center (DMSC) includes only traffic routing and subscriber assignments, the dispatcher mobile switching center (DMSC) for distributing call processing loads onto the mobile switching centers (MSCs) of the pool of mobile switching centers (MSCs).

12. The method of claim 1, wherein said step of providing the dispatcher mobile switching center (DMSC) includes traffic routing and subscriber assignments, the dispatcher mobile switching center (DMSC) for distributing call processing loads onto the mobile switching centers (MSCs) of the pool of mobile switching centers (MSCs), the dispatcher mobile switching center (DMSC) further having a capability of having resident subscribers and for performing call processing of its own.

13. A wireless telecommunications network having an architecture based upon subscriber distribution, said network comprising:

a base station subsystem (BSS);

a pool of mobile switching centers (MSCs) interconnected with one another, the mobile switching centers including visitor location registers (VLRs); and a dispatcher mobile switching center (DMSC) coupled between said base station subsystem (BSS) and said pool of mobile switching centers (MSCs) for establishing communication between said base station subsystem (BSS) and said pool of mobile switching centers (MSCs), said dispatcher mobile switching center (DMSC) further for distributing mobile station subscribers and call related work among said pool of mobile switching centers (MSCs).

14. The wireless telecommunications network of claim 13, wherein said dispatcher mobile switching center (DMSC) includes a table of subscribers and corresponding MSC/VLR entries, each subscriber corresponding to a mobile station identification (mob_id) and each corresponding MSC/VLR entry corresponding to a particular mobile switching center/visitor location register identification (VLR_id) of said pool of mobile switching centers (MSCs), a corresponding MSC/VLR entry being assigned to the subscriber when the mobile station of the respective subscriber is initially powered up.

15. The wireless telecommunications network of claim 14, wherein said dispatcher mobile switching center (DMSC) assigns a subscriber mobile station identification (mob_id) to a corresponding mobile switching center/visitor location identification (VLR_id) according to a prescribed assignment.

16. The wireless telecommunications network of claim 14, wherein said dispatcher mobile switching center (DMSC) makes use of the table entry associations of subscribers and corresponding MSC/VLR entries in order to decide which mobile switching center (MSC) of said pool of mobile switching centers (MSCs) to route a mobile originated call when one occurs.

17. The wireless telecommunications network of claim 14, wherein said dispatcher mobile switching center (DMSC) performs a land to land call upon the occurrence of a mobile terminated call/paging procedure, a home location register (HLR) being provided for tracking of visitor location registers (VLRs) and subscribers according to GSM standards, the mobile terminated call being first routed to a gateway mobile switching center (GMSC) and then being routed to said base station subsystem (BSS) through said dispatcher mobile switching center (DMSC).

18. The wireless telecommunications network of claim 14, wherein the table is further characterized in that the MSC/VLR identifications (VLR_ids) are indexed by identity of mobile subscribers (mob_ids).

19. The wireless telecommunications network of claim 18, further wherein the table includes a pseudo visitor location register (pseudo VLR) having a structure optimized for very fast searches and updates.

20. The wireless telecommunications network of claim 14, wherein upon an initial attach of a mobile station, said dispatcher mobile switching center (DMSC) checks the table entry associations to determine if the mobile station is registered in one of the MSC/VLRs of said pool of MSCs and (a) if the mobile station is registered, then an attach message is routed to the corresponding MSC/VLR and an attach operation is completed, and (b) if the mobile station is not registered, then said dispatcher mobile switching center (DMSC) assigns the mobile station to one of the MSC/VLRs of said pool of MSCs depending upon a prescribed criteria and keeps a record of the association in the table of said dispatcher mobile switching center.

21. The wireless telecommunications network of claim 14, wherein upon a mobile station originated call, said BSS initiates a call setup with said dispatcher mobile switching center (DMSC), said dispatcher mobile switching center (DMSC) then checks the table entry associations to determine if the mobile station is registered in one of the MSC/VLRs of said pool of MSCs and (a) if the mobile station is registered, then said DMSC acts as a transparent relay between said BSS and the corresponding MSC of said pool of MSCs, said DMSC transferring all A-interface messages transparently to the corresponding MSC, wherein the call setup proceeds thereafter according to GSM standards, and (b) if the mobile station is not registered, then said dispatcher mobile switching center (DMSC) assigns the mobile station to one of the MSC/VLRs of said pool of MSCs depending upon a prescribed criteria, keeps a record of the association in the table of said dispatcher mobile switching center (DMSC), and then proceeds as if the mobile station is registered.

22. The wireless telecommunications network of claim 13, wherein said pool of mobile switching centers (MSCs) includes at least five (5) mobile switching centers.

23. The wireless telecommunications network of claim 13, wherein said dispatcher mobile switching center (DMSC) provides only traffic routing and subscriber assignments, said dispatcher mobile switching center (DMSC) for distributing call processing loads onto the mobile switching centers (MSCs) of said pool of mobile switching centers (MSCs).

24. The wireless telecommunications network of claim 13, wherein said dispatcher mobile switching center (DMSC) provides traffic routing and subscriber assignments, said dispatcher mobile switching center (DMSC) for distributing call processing loads onto the mobile switching centers (MSCs) of said pool of mobile switching centers (MSCs), said dispatcher mobile switching center (DMSC) further including a capability of having resident subscribers and for performing call processing of its own.

25. A wireless telecommunications network having an architecture based upon subscriber distribution, said network comprising:

a base station subsystem (BSS);

a pool of mobile switching centers (MSCs) interconnected with one another, the mobile switching centers including visitor location registers (VLRs); and a dispatcher mobile switching center (DMSC) coupled between said base station subsystem (BSS) and said pool of mobile switching centers (MSCs) for establishing communication between said base station subsystem (BSS) and said pool of mobile switching centers (MSCs), said dispatcher mobile switching center (DMSC) further for distributing mobile station subscribers and call related work among said pool of mobile switching centers (MSCs), wherein said dispatcher mobile switching center (DMSC) includes a table of subscribers and corresponding MSC/VLR entries, each subscriber corresponding to a mobile station identification (mob_id) and each corresponding MSC/VLR entry corresponding to a particular mobile switching center/visitor location register identification (VLR_id) of said pool of mobile switching centers (MSCs), wherein the table is further characterized in that the MSC/VLR identifications (VLR_ids) are indexed by identity of mobile subscribers (mob_ids).

* * * * *